Patented Mar. 31, 1936

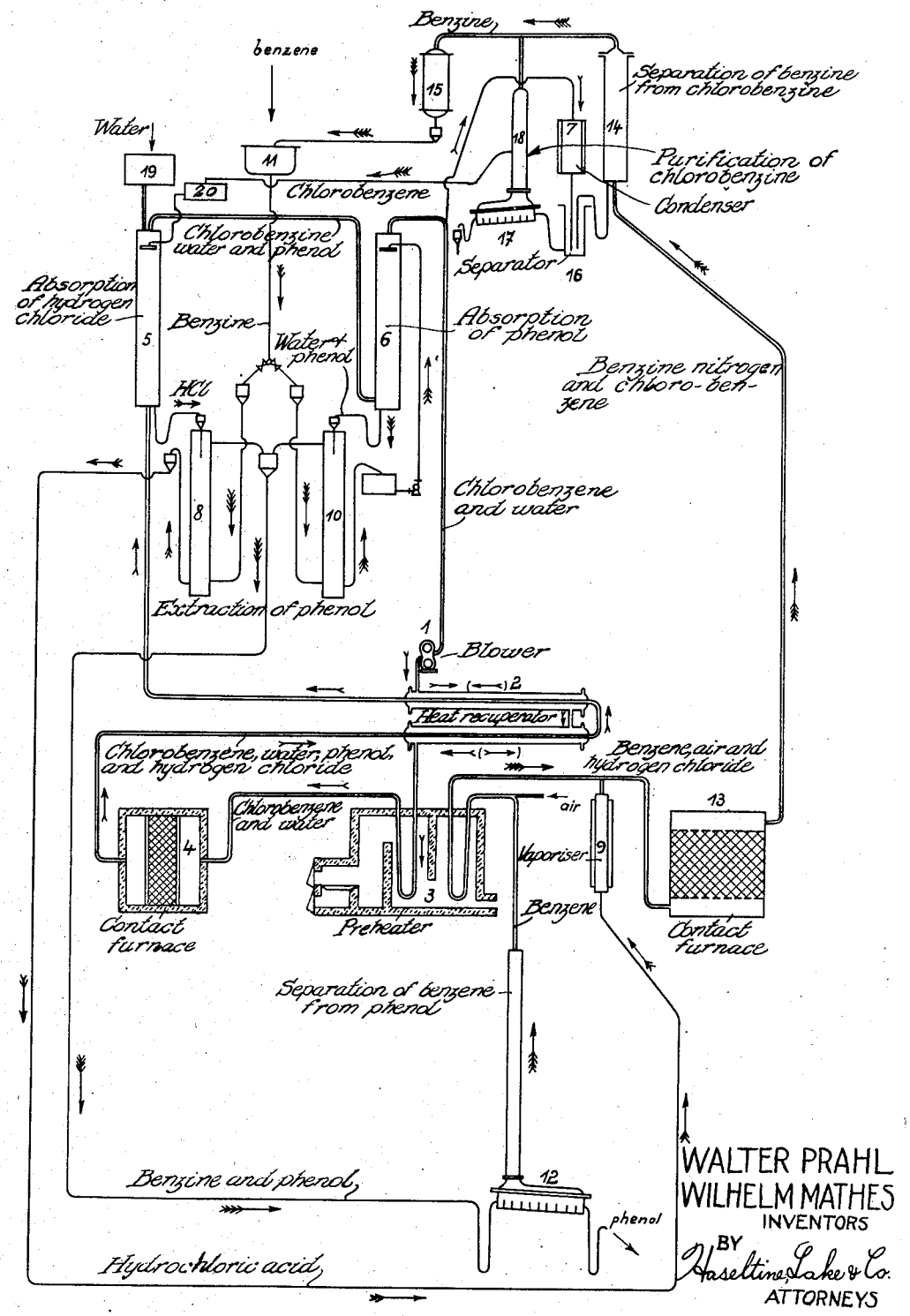

2,035,917

UNITED STATES PATENT OFFICE 2,035,917

MANUFACTURE OF PHENOL

Walter Prahl and Wilhelm Mathes, Ludwigshafen-on-the-Rhine, Germany, assignors to Dr. F. Raschig G. m. b. H., Ludwigshafen-on-the-Rhine, Germany, a firm of Germany Application June 13, 1933, Serial No. 675,527
In Germany June 20, 1932

12 Claims. (Cl. 260—154)

This invention relates to a process for the manufacture of phenol, and more especially to a simplification and reduction of costs in the manufacture of phenol from benzene with chlorobenzene as intermediate product.

The main object of the invention is a new process for the production of phenol from benzene by a hitherto unknown combination of a known process for the production of chlorobenzene from benzene, hydrogen-chloride and air with the further known process for the production of phenol by hydrolysis of chlorobenzene.

A further object of the invention is a new process for the production of phenol from benzene, in which as few as possible by-products are obtained.

A further object of the invention is a new process for the production of phenol from benzene by using chlorobenzene, in which use is made of the by-products obtained in one step of the process, and in which furthermore, use is made of the energies liberated in the other step of the process, which have no value for the purpose of said other step.

Further, it is the object of this invention to produce phenol by means of a new process which results in only a very small amount of by-products.

Processes are known for converting benzene into chlorobenzene by the action of hydrogen-chloride and air or oxygen. Processes are also known for hydrolizing chlorobenzene by the action of water vapor in the presence of a catalyst so as to produce phenol and hydrochloric acid.

Since according to the equation $$C_6H_6 + HCl + O = C_6H_5Cl + H_2O$$

in the first process hydrogen chloride is consumed and water is produced, whilst in the second process water is consumed and hydrochloric acid produced in accordance with the equation $$C_6H_5Cl + H_2O = C_6H_5OH + HCl$$

it should be possible theoretically by combining these two processes, as is seen by the equation $$C_6H_6 + O = C_6H_5OH$$

resulting from the addition of the two foregoing equations, to provide the process for the manufacture of phenol from benzene which consumes no chemicals other than benzene and atmospheric oxygen and would thus permit the production of phenol in an extraordinarily economical manner.

It has not hitherto been possible to realize such a combined process in practice, because in the known processes for making phenol the hydrogen-chloride which is produced and, in a combination of the two reactions into a single process, would have to be used again for the production of chlorobenzene, is not obtained in a form in which it can be further used, that is to say in the form of an aqueous solution of a concentration which permits its use for making chlorobenzene. On the contrary in all the known processes it is obtained in presence of so much water that it would appear hopeless to attempt to isolate it in a sufficiently concentrated form and thus render it useful. In these known processes it was therefore neutralized directly after its production by means of an alkaline substance, such as caustic soda solution, an operation which would obviously exclude its further utilization for the manufacture of chlorobenzene.

There has recently become known a process which renders it possible to recover from the mixture of vapors resulting from the passage of the vapors of chlorobenzene and water over a catalyst at a raised temperature, by a suitable treatment, for example with a relatively small proportion of water, the hydrogen-chloride in the form of a concentrated solution; this process forms the subject of United States application Ser. No. 587,928 (filed January 21, 1932). Such a solution is applicable for the production of chlorobenzene and thus permits the possibility of combining into a unitary process the two reactions hereinbefore referred to. This combination forms the subject of the present invention.

In the investigation of the combined process it was found that besides the advantages which were to be expected on theoretical grounds there are also attained further technical advantages which were not to be expected.

(a) Firstly there is an economy in steam and cooling water required for evaporating and condensing the benzene.

When the phenol formed besides hydrogen-chloride in the second stage is isolated by the process of the aforesaid specification, it is obtained in the form of an aqueous solution of about 8 per cent strength from which it is isolated advantageously by extraction with a solvent. Thus the water containing phenol is advantageously extracted with benzene, the benzene then being separated by distillation from the phenol contained in it.

On the other hand for the production of chlorobenzene in the first stage a considerable quantity of benzene must be vaporized (compare Example 5 of U. S. Patent No. 1,963,761).

Thus when the two processes are carried out independently a certain quantity of benzene must be vaporized and again condensed for the purpose of isolating the phenol in the second stage, whilst an almost equally large quality of benzene must be vaporized in the first stage for passage over the catalyst and condensed after passage over the catalyst.

The combined process in accordance with the invention offers the possibility of carrying out both the isolation of the phenol and the production of the chlorobenzene with only a single evaporation and condensation of the same quantity of benzene. For this purpose the benzene which in the first stage is to be vaporized for the production of chlorobenzene is previously used for the extraction of the phenol from its aqueous solution in the second stage; in this operation the benzene contained in the solution of phenol in benzene is separated from the phenol by evaporation and the benzene vapors thus obtained are introduced, after having been suitably preheated, into the contact furnace of the first stage. The combination of the two processes thus attains the technical advantage that only about half the quantity of steam and cooling water is required for obtaining the same result as would be obtained by conducting the two processes independently but otherwise in the same manner.

(b) Secondly the combined process permits a better utilization of the heat contained in the heating gases.

The most advantageous reaction temperature for the second stage, that is for the conversion of chlorobenzene and steam into phenol and hydrogen-chloride, is about 500° C. After having separated the reaction products by means of the process of U. S. application Ser. No. 587,928 filed January 21, 1932 the mixture of the vapors of chlorobenzene and water which have not reacted and are to be returned to the contact furnace has a temperature of 95–100° C. The mixture is heated to the reaction temperature advantageously in part by heat exchange with the hot vapors leaving the furnace and having a temperature of about 500° C., the temperature of the in-going vapors being thus raised to about 400° C. The quantity of heat corresponding with the temperature difference of, for example, 100° C. must be supplied to the vapors by means of furnace gases. The sensible heat of the furnace gases can thus be utilized only to an extent corresponding to the reduction of their temperature to about 450° C., even if use were made of the counter-current principle which in this case is not advisable owing to the danger of over-heating.

In carrying out the process of the first stage as described, for example, in U. S. Patent No. 1,963,761 it is necessary to raise the temperature of the vapors of benzene and hydrochloric acid and air from about 100° to about 250° C.

In the combination of the two processes this becomes possible without further expedients by using the heating gases of the second stage, having for example a temperature of 450° C., for preheating the vapors which are to react in the first stage. In practice this is most simply conducted by heating the vapors for the two stages in a single furnace and placing the heating pipes in which the vapor mixture of benzene and hydrochloric acid and the air are to be preheated behind the heating pipes for heating the mixture of chlorobenzene and water vapors. In this manner is attained the substantially better utilization of the heat contained in the heating gases as hereinbefore referred to.

The temperatures for carrying out the process of the production of chlorobenzene should exceed 150° C., preferably they do not exceed 300° C. The temperatures for carrying out the process of the production of phenol should exceed 350° C., preferably they do not exceed 650° C.

The special advantage of heat economy according to the above statements lies in the fact that the amounts of heat required by the two systems in question correspond approximately to each other, especially when carrying out the process under the best conditions (see the above mentioned temperatures and the figures for the reacting quantities given in the example beneath). Therefrom it results that for carrying out the process it is not necessary to apply additional heat to one or the other system.

(c) Finally the combination of the two processes renders it possible to avoid certain purification operations and their attendant losses.

The hydrochloric acid of about 17 per cent strength which is obtained in the course of the separation of the reaction products of the second stage according to the process of U. S. application Ser. No. 587,928 (filed January 21, 1932) still contains small quantities of phenol which is advantageously recovered by extraction with benzene. The hydrochloric acid retains after extraction small quantities of benzene which are not only lost when the acid is used for some extraneous purpose but in many cases would be harmful to the use of the acid and in practice would therefore have to be removed, for example by boiling, by passage of a current of air, by absorption by means of active charcoal or otherwise, before the acid could be used. In the process of the present invention, in which the hydrochloric acid is used directly for the production of chlorobenzene, not only is the presence of benzene harmless but the benzene is not even lost, since already it constitutes a part of the benzene which is to be brought to reaction with the hydrogen-chloride.

Thus by the combination of the two processes in accordance with the invention complicated processes for purifying the hydrochloric acid and losses of the benzene contained in it are avoided.

In the following quantitative example of a process for the production of 10,000 kilos of phenol per day there is described one possibility of combining the two processes in accordance with the invention whilst making use of the aforesaid advantages. It must however be specifically stated that the invention is not limited to the procedure described in the example or to the simultaneous utilization of all the advantages which it is possible to attain by the combination. In the following example reference is made to the accompanying drawing which shows diagrammatically a plant suitable for carrying out the process.

By means of a blower 1 a mixture of the vapors of 5,500 kilos of chlorobenzene and 5,000 kilos of water having a temperature of 100° C. is induced and forced through the apparatus per hour. The vapors pass first through a heat recuperator 2 in which their temperature is raised to about 400° C. by exchange of heat with the vapors having a temperature of 500° C. and leaving the contact furnace 4 which serves for the hydrolysis of chlorobenzene. They then pass through a preheater 3 common to the first and second stages of the process, where they are heated to 500° C.

and from which they pass into the contact furnace 4. The mixture of vapors leaving the contact furnace 4 is cooled to about 200° C. in the heat recuperator 2 and then passes into a washing tower 5 constructed of acid-proof material, in which by the addition of 1,400 kilos of water and 1,000 kilos of chlorobenzene (from a tank 20) per hour the hydrogen-chloride is washed out and the chlorobenzene and water consumed in the reaction are replaced in the circulating mixture of vapors.

The vapors leaving the washing tower 5 are led into a second washing tower 6 in which the phenol contained in them is removed by washing with 8,000 kilos of hot water (coming from 10) per hour. The excess of water and chlorobenzene introduced in the washing tower 5 pass in the form of vapor through the washing tower 6 to a condenser 7 whilst the bulk of the vapors is again induced by the blower 1 and returned to the cycle.

The hydrochloric acid which runs off at the base of the washing tower 5 is led into another washing tower 8 completely filled with liquid, from which it passes to a hydrochloric acid vaporizer 9.

The solution of phenol which runs off at the base of the washing tower 6 at the rate of 400 kilos of phenol and 8,000 kilos of water per hour passes through a washing tower 10 filled with liquid and is pumped in circulation back into the washing tower 6.

From a container 11 there are introduced per hour at the base of the washing tower 8, 600 kilos of benzene and at the base of the washing tower 10, 4,000 kilos of benzene; in the washing tower 8 the benzene extracts phenol contained in the hydrochloric acid and in the washing tower 10 it extracts the phenol contained in the aqueous solution. The solutions of phenol in benzene which leave the washing towers 8 and 10 pass to a still 12 having a column, where the benzene is distilled, the vapors produced being passed through the preheater 3. After having been suitably preheated the benzene vapors, mixed with 1,400 kilos of hydrochloric acid of 17 per cent strength and 1,000 kilos of air per hour are introduced by means of a blower into a contact furnace 13 in which the benzene is chlorinated. 420 kilos of phenol run off per hour as residue from the still.

The chlorobenzene which is formed in the contact furnace 13 in quantity amounting to 550 kilos per hour is advantageously recovered by fractional condensation in a column 14 and after separation from water in the separating funnel 16 and separation from benzene and dichlorobenzene in the still 17 with the column 18 returned to the system by introduction into the washing tower 5. Unchanged benzene passes in the form of vapor from the column 14 into a condenser 15 where it is completely condensed and fed into the container 11.

In this manner by a combination of two reactions which are known per se there is provided a process for the production of phenol from benzene in which, apart from small quantities of hydrochloric acid which are converted into dichlorobenzene and some more highly chlorinated products and must therefore be replaced, there are required no auxiliary chemicals either for the production or for the isolation of the product and in which by-products are not obtained in appreciable quantities.

The first stage of reaction is carried out in the presence of catalysts, which are adapted to produce chlorobenzene from a mixture of benzene, hydrochloric acid (hydrogen chloride) and air, such as mixtures of a compound of copper and a catalytically active compound of a metal of groups 3–8 of the periodic system. The second stage of the reaction is carried out in the presence of catalysts which are adapted to aid the hydrolysis of the chlorobenzene in the vapor phase, such as catalysts containing chiefly catalytically active silicic acid or phosphates of metals of the second group of the periodic system.

We claim:—

1. Process for the production of phenol comprising the reaction of benzene with hydrogen-chloride and oxygen at temperatures exceeding 150° C. to produce chlorobenzene, causing the latter to react at temperatures exceeding 350° C. with steam in the vapor phase to produce phenol, utilizing the hydrogen-chloride resulting from the conversion of the chlorobenzene into phenol for converting a further quantity of benzene into chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

2. Process for the production of phenol comprising the reaction of benzene with hydrogen-chloride and oxygen at temperatures exceeding 150° C. to produce chlorobenzene, causing the latter to react at temperatures exceeding 350° C. with steam in the vapor phase to produce phenol, utilizing the benzene which is to be converted into chlorobenzene at first for the extraction of phenol from the solution of phenol resulting from the hydrolysis of the chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

3. Process for the production of phenol comprising the reaction of benzene with hydrogen-chloride and oxygen at temperatures exceeding 150° C. to produce chlorobenzene, causing the latter to react at temperatures exceeding 350° C. with steam in the vapor phase to produce phenol, utilizing the hydrogen-chloride resulting from the conversion of the chlorobenzene into phenol for converting a further quantity of benzene into chlorobenzene, furthermore utilizing the benzene which is to be converted into chlorobenzene at first for the extraction of phenol from the solution of phenol resulting from the hydrolysis of the chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

4. Process for the production of phenol comprising the reaction of benzene with hydrogen-chloride and oxygen at temperatures exceeding 150° C. to produce chlorobenzene, causing the latter to react at temperatues exceeding 350° C. with steam in the vapor phase to produce phenol, utilizing the hydrogen-chloride resulting from the conversion of the chlorobenzene into phenol for converting a further quantity of benzene into chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

5. Process for the production of phenol comprising the reaction of benzene with hydrogen-chloride and oxygen at temperatures exceeding 150° C. to produce chlorobenzene, causing the latter to react at temperatures exceeding 350° C. with steam in the vapor phase to produce phenol, utilizing the benzene which is to be converted into chlorobenzene at first for the extraction of phenol from the solution of phenol resulting from the hydrolysis of the chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

6. Process for the production of phenol consisting in the reaction of benzene with hydrogen-chloride and oxygen at temperatures exceeding 150° C. to produce chlorobenzene, causing the latter to react at temperatures exceeding 350° C. with steam in the vapor phase to produce phenol, utilizing the hydrogen-chloride resulting from the conversion of the chlorobenzene into phenol for converting a further quantity of benzene into chlorobenzene, furthermore utilizing the benzene which is to be converted into chlorobenzene at first for the extraction of phenol from the solution of phenol resulting from the hydrolysis of the chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

7. Process for the production of phenol comprising the reaction of benzene with hydrogen-chloride and oxygen at temperatures between 150 and 300° C. to produce chlorobenzene, causing the latter to react at temperatures between 350 and 650° C. with steam in the vapor phase to produce phenol, utilizing the hydrogen-chloride resulting from the conversion of the chlorobenzene into phenol for converting a further quantity of benzene into chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

8. Process for the production of phenol comprising the reaction of benzene with hydrogen-chloride and oxygen at temperatures between 150° and 300° C. to produce chlorobenzene, causing the latter to react at temperatures between 350 and 650° C. with steam in the vapor phase to produce phenol, utilizing the benzene which is to be converted into chlorobenzene at first for the extraction of phenol from the solution of phenol resulting from the hydrolysis of the chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

9. Process for the production of phenol comprising the reaction of benzene with hydrogen-chloride and oxygen at temperatures between 150 and 300° C. to produce chlorobenzene, causing the latter to react at temperatures between 350 and 650° C. with steam in the vapor phase to produce phenol, utilizing the hydrogen-chloride resulting from the conversion of the chlorobenzene into phenol for converting a further quantity of benzene into chlorobenzene, furthermore utilizing the benzene which is to be converted into chlorobenzene at first for the extraction of phenol from the solution of phenol resulting from the hydrolysis of the chlorobenzene, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

10. Process for the production of phenol comprising the reaction of benzene with hydrogen-chloride and oxygen at temperatures between 150 and 300° C. to produce chlorobenzene, causing the latter to react at temperatures between 350 and 650° C. with steam in the vapor phase to produce phenol, utilizing the hydrogen-chloride resulting from the conversion of the chlorobenzene into phenol for converting a further quantity of benzene into chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

11. Process for the production of phenol comprising the reaction of benzene with hydrogen-chloride and oxygen at temperatures between 150 and 300° C. to produce chlorobenzene, causing the latter to react at temperatures between 350 and 650° C. with steam in the vapor phase to produce phenol, utilizing the benzene which is to be converted into chlorobenzene at first for the extraction of phenol from the solution of phenol resulting from the hydrolysis of the chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

12. Process for the production of phenol comprising the reaction of benzene with hydrogen-chloride and oxygen at temperatures between 150 and 300° C. to produce chlorobenzene, causing the latter to react at temperatures between 350 and 650° C. with steam in the vapor phase to produce phenol, utilizing the hydrogen-chloride resulting from the conversion of the chlorobenzene into phenol for converting a further quantity of benzene into chlorobenzene, furthermore utilizing the benzene which is to be converted into chlorobenzene at first for the extraction of phenol from the solution of phenol resulting from the hydrolysis of the chlorobenzene, the reactants for the production of the chlorobenzene being heated only by means of the waste heat contained in the heating gases used in the conversion of chlorobenzene into phenol, the first reaction being carried out in the presence of catalysts consisting of mixtures of a compound of copper and a catalytically active compound of a metal of groups 3 to 8 of the periodic system, the second in presence of catalysts promoting the hydrolysis of chlorobenzene in the vapor phase.

WALTER PRAHL.
WILHELM MATHES.

CERTIFICATE OF CORRECTION.

Patent No. 2,035,917. March 31, 1936.

WALTER PRAHL, ET AL.

It is hereby certified that error appears in the above numbered patent requiring correction as follows: Throughout the drawing, in each occurrence in the legends, for the misspelled words "benzine" and "chlorobenzine" read benzene and chlorobenzene; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.